Oct. 28, 1969  KEIJI TATENO  3,475,692

APPARATUS FOR DETECTING AND ELIMINATING HUM

Filed March 15, 1968

INVENTOR
KEIJI TATENO

BY *Russell, Chittik & Pfund*

ATTORNEY

United States Patent Office 3,475,692
Patented Oct. 28, 1969

3,475,692
APPARATUS FOR DETECTING AND ELIMINATING HUM
Keiji Tateno, Tokyo, Japan, assignor to Nihon Kohden Kogyo, Ltd., Tokyo, Japan, a corporation of Japan
Filed Mar. 15, 1968, Ser. No. 713,518
Claims priority, application Japan, Mar. 24, 1967, 42/18,334
Int. Cl. H03f 1/36, 3/68
U.S. Cl. 330—103                              5 Claims

ABSTRACT OF THE DISCLOSURE

To detect hum components there are provided identical first and second means each comprising a first magnetic circuit, a magnetic circuit including a moving coil disposed in the air gap thereof, a second magnetic circuit including a voltage inducing coil disposed in the air gap thereof, means to mechanically couple the moving coil and the voltage inducing coil, and a damping means to provide a damping force and inertia to the rotary movement of the connecting means. The magnetic circuits of the first and second means are energized by reference voltages dephased from each other by 90°, the moving coils are supplied with a low frequency signal containing the hum components and the outputs of the first and second voltage inducing means are combined to detect the hum components. The output from an amplifier connected to receive the low frequency signal containing the hum components is supplied to the first and second means mentioned above and energized by reference voltages dephased from each other by 90° and the hum component output signals provided by the first and second means are negatively fed back to the amplifier to eliminate the hum components from the output from the amplifier.

Background of the invention

This invention relates to an apparatus for detecting hum components contained in high frequency signals representing electrical phenomena or vibration phenomena or the like of living bodies and to means for eliminating hum components from the apparatus utilizing said signals.

When measuring electrical phenomena or vibration phenomena of human bodies, for example when measuring the waveform of an electroencephalogram it is generally necessary to amplify low frequency signals representing the electroencephalogram. In amplifying the measured signal, or the low frequency signal, especially when the source frequency is included in the frequency band of said low frequency signals hums are incorporated in the low frequency signals by various reasons. Incorporation of hums makes it difficult to correctly determine electrical phenomena or vibration phenomena of living bodies, especially when it is desired to record and observe the waveform of the electroencephalogram during a surgical operation such recording and observation become very difficult. For this reason, it is important to separate and detect hum components incorporated into low frequency signals and how to remove hum components contained in low frequency signals is one of the important problems in the field of medical electronics. It has been extremely difficult to remove hum components without affecting the waveform of the low frequency signals so that apparatus for effectively eliminating hum components has been highly desired.

Summary of the invention

Accordingly, a first object of this invention is to provide a new hum component detecting apparatus capable of detecting the magnitude of the hum components contained in low frequency signals.

A second object of this invention is to construct said hum component detecting apparatus to have simple and inexpensive construction by utilizing the principle of a dynamometer type electrical meter.

A third object of this invention is to provide a novel hum eliminating device capable of eliminating hum components from low frequency signals containing them thus providing only low frequency signals of correct waveform.

A fourth object of this invention is to provide a novel treating system for low frequency waveforms generated by living bodies which is constructed so that recording and observation operations of the waveform of the electroencephalogram or electrocardiograph or the like obtained during surgical operations can be readily made and appropriate decisions can be derived from the recorded waveforms.

The term "hum" as used in this specification and appended claims is intended to mean the so-called AC noise incorporated into the low frequency signals to be measured in the frequency region thereof. The frequency of the hum is the same as the frequency of the source for the measuring apparatus but its amplitude and phase are different from those of the source. For the sake of explanation, the relationship between the source frequency and the hum associated therewith and the principle of extracting the hum component will be firstly considered.

By denoting the voltage of an AC source with $e$, its frequency with $f(2\pi f = \omega)$, and the maximum amplitude with $A_M$, the voltage can be expressed by the following Equation 1:

$$e = A_M \sin \omega t \quad (1)$$

Further, by denoting the maximum amplitude of the voltage ($h$) of the hum component contained in the low frequency signal waveform with $B_M$, and the phase difference with reference to the voltage $e$ with $\phi$, the voltage ($h$) can be shown by Equation 2.

$$h = B_M \sin (\omega t + \phi) \quad (2)$$

By introducing Equations 1 and 2 into a multiplier circuit, a result as shown in Equation 3 could be obtained.

$$A_M \sin \omega t \times B_M \sin (\omega t + \phi)$$
$$= \tfrac{1}{2} A_M B_M \cos \phi - \tfrac{1}{2} A_M B_M \cos (2\omega t + \phi) \quad (3)$$

Assuming that $e'$ represents the voltage of an AC source having a phase advanced 90° with respect to the voltage $e$ represented by Equation 1, then the voltage $e'$ can be shown by the following Equation 4

$$e' = A_M \cos \omega t \quad (4)$$

By multiplying Equation 4 with Equation 2, we obtain the following Equation 5

$$A_M \cos \omega t \times B_M \sin (\omega t + \phi)$$
$$= \tfrac{1}{2} A_M B_M \sin \phi + \tfrac{1}{2} A_M B_M \sin (2\omega t + \phi) \quad (5)$$

Noting respective first terms in Equations 3 and 5, and by deriving respective AC voltages corresponding to these first terms we can obtain following equations respectively from Equations 1, 3, 4, and 5

$$\tfrac{1}{2} A_M B_M \cos \phi \times A_M \sin \omega t \quad (6)$$

and $$\tfrac{1}{2} A_M B_M \sin \phi \times A_M \cos \omega t \quad (7)$$

By adding Equations 6 and 7

$$\tfrac{1}{2} (A_M)^2 B_M \sin (\omega t + \phi) \quad (8)$$

In Equation 8, by assuming that $A_M$ has a definite value and is represented by any constant K, the equation can be rewritten as $$KB_M \sin(\omega t + \phi) \qquad (9)$$

The voltage represented by Equation 9 shows the hum component incorporated into the low frequency signal and it is now clear that this hum component is readily obtained by multiplication and addition operations.

This invention is based on the unique utilization of the principle outlined just above.

Briefly stated, in accordance with this invention there is provided a hum component detecting apparatus comprising identical first and second means each including a first magnetic circuit, a moving coil rotatably disposed in the first magnetic circuit, a second magnetic circuit adapted to produce a magnetic field having the same phase as that produced by the first magnetic field, a voltage inducing means rotatably disposed in the second magnetic circuit, a connecting means to mechanically interconnect the moving coil and the first voltage inducing means, a damping means to provide a damping force and inertia to the rotary movement of the connecting means and a source of reference voltage adapted to create magnetic fields in the first and second magnetic circuits. The second means is identical to the first means except that the magnetic field created in its magnetic circuit is dephased by 90° with respect to the magnetic field in the magnetic circuits of the first means. Means are also provided to apply a low frequency signal containing a hum component across the moving coils of the first and second means and to combine the outputs from the voltage inducing means thereof whereby to detect the hum component.

According to another aspect of this invention there is provided a hum component eliminating device comprising an amplifier arranged to receive a low frequency signal containing a hum component, a first means and second means constructed as above described and supplied with the output from the amplifier, a source of reference voltage connected to the first means, a phase shifter adapted to shift the phase of the reference voltage by 90° and to apply the phase shifted voltage to the second means and means to negatively feedback to the amplifier an output signal provided by the first and second means and representing the hum component whereby to eliminate the hum component from the output of the amplifier.

The voltage inducing means employed in the first and second means may be substituted by any suitable means, such as the Hall elements.

Brief description of the drawing

Further objects and advantages of the present invention will become apparent and this invention will be better understood from the following description, reference being made to the accompanying drawing in which.

Description of the preferred embodiment

Figure 1A:
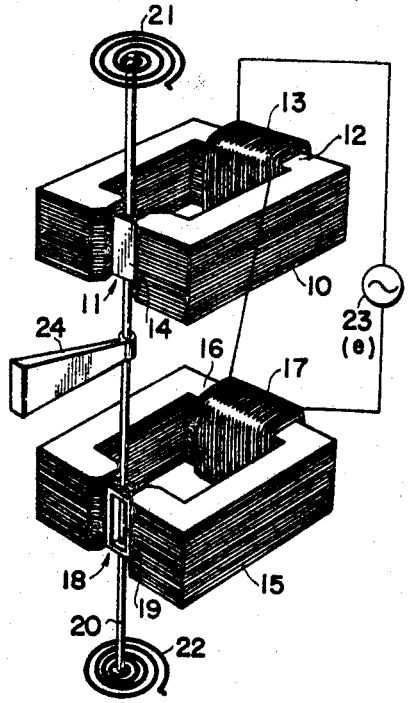
FIG. 1A is a perspective view of a first means of the novel hum component detecting apparatus.

The first means of the novel hum detecting apparatus has a construction as shown in FIG. 1A.

The first means comprises an annular magnetic core 10 including an air gap 11 defined by curved pole faces to concentrate magnetic flux. The core shown is of the type commonly used in dynamometer type instruments and the like and comprises a first magnetic circuit. A coil 13 is wound upon a yoke 12 of the first magnetic circuit in opposed relation to the air gap 11 in which is disposed a moving coil 14. A second magnetic circuit having substantially the same configuration as the first magnetic circuit is disposed in spaced apart parallel relationship. The second magnetic circuit 15 also includes a coil 17 wound upon a yoke 16 and an air gap 18 defined by parallel pole faces. An induction coil 19 is disposed in the air gap 18. Moving coil 14 and induction coil 19 are interconnected by means of a single connecting shaft 20 with its opposite ends connected to spiral springs 21 and 22 to receive control power therefrom. Coils 13 and 17 are serially energized from an AC source 23 having a voltage $e$ represented by above Equation 1. Further, it is to be understood that coils 13 and 17 are wound in the same direction to create magnetic fields of the same phase in respective magnetic fields, and that a low frequency signal containing hum components is impressed across the moving coil 14.

Figure 1B:
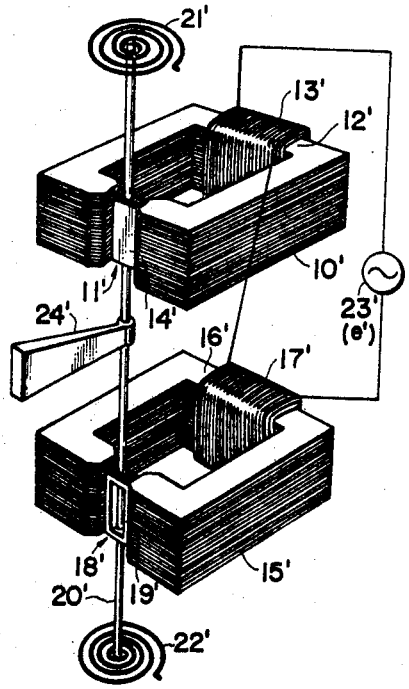
FIG. 1B is a perspective view of a second means of the novel hum component detecting apparatus and FIG. 2 shows an electric connection diagram of the novel hum eliminating device.

As shown in FIG. 1B, the second means of this invention has substantially the same construction as the first means so that components of FIG. 1B corresponding to those of FIG. 1A are designated by corresponding primed reference numerals. However, the second means is different from the first means in that the voltage of the source 23' is advanced in phase by 90° with respect to the voltage of the source 23 or the source 23' has the voltage $e'$ represented by Equation 4. As shown in FIGS. 1A and 1B, dampers 24 and 24' are secured to shafts 20 and 20' respectively to absorb vibration frequencies created upon rotation of the shafts.

The operation of the novel hum detecting apparatus constructed as above described in as follows:

In the first means when the source voltage $e$ as shown by Equation 1 in impressed across coils 13 and 17 and the low frequency signal containing the hum component is applied across the movable coil 14, a torque as shown by said Equation 3 will be created by the moving coil 14 according to the principle of the dynamometer type instrument, thus tending to rotate the shaft 20. During this rotation, the torque having the angular frequency ($\omega$) or the torque shown by the second term of Equation 3 as well as the input signal component are absorbed by the action of the damper 24 whereby the shaft 20 is rotated only according to the torque $A_M B_M \cos \phi$ represented by the first term of Equation 3. Rotation of the shaft 20 results in the same rotation of the induction coil 19 thus inducing a voltage as represented by Equation 6 in the induction coil 19. The induced voltage is taken out through not shown terminals of the induction coil 19.

In the second means the voltage $e'$ represented by said Equation 4 is impressed across coils 13' and 17' while the low frequency signal containing hum components is supplied to the moving coil 14'. Then, in the same manner as in the first means, the voltage shown by said Equation 7 will be induced in the induction coil 19'. Accordingly, by combining voltages induced in induction coils 19 and 19', or the voltages represented by Equations 6 and 7, by means of a well known method, it becomes possible to detect a voltage $KB_M \sin(\omega t + \phi)$ represented by said Equation 9, which is identical to the hum component represented by Equation 8.

According to this invention, the torque of the AC oscillation component produced by the mutual action between the first magnetic circuit and the movable coil by increasing the damping coefficient afforded by the inertia of the moving coil and induction coil or by the damping means 24 and 24' whereby to descriminatively select a torque proportional to the phase component. As a consequence, frequency components having frequencies different from the frequency of the AC source voltage would not appear on the output side of the measuring apparatus thus enabling accurate detection of the hum component. It will clear that, in this embodiment the voltage of the AC source functions as the reference signal with respect to the hum component. For this reason, to detect hum components of higher harmonics it is necessary to use a reference signal having the frequency of the corresponding higher harmonic. While in this embodiment, an induction coil is utilized as the voltage inducing means to derive an induced voltage proportional to the reference signal or the voltage of the AC source, it should be understood that the invention is by no means limited to such an arrangement and that a Hall element could be used with equal results.

To render more effective the damping action of the damping means, suitable fluid, for example oil, may be used to cooperate with damping means 24 and 24' on the rotary shafts.

Another feature of this invention lies in the provision of a novel hum eliminating device by utilizing above disclosed hum detecting apparatus.

Figure 2:
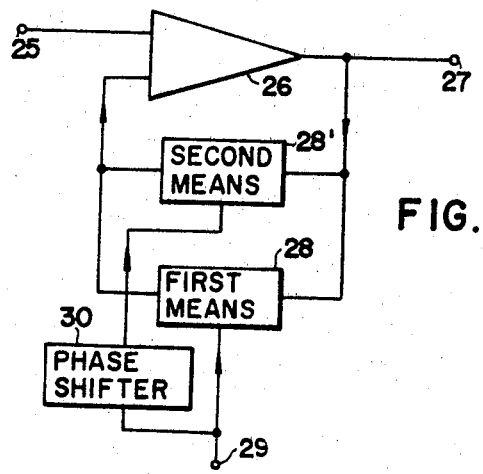

Referring now to FIG. 2, which shows a block diagram of an electric circuit for eliminating the hum component contained in a low frequency signal when amplifying the same, the low frequency signal incorporated with the hum component is supplied to an amplifier 26 through an input terminal 25. The amplified signal is supplied to an output terminal 27. Reference numerals 28 and 28' represent the first and second means shown in FIGS. 1A and 1B. The AC voltage e is supplied through a terminal 29 and a portion thereof is advanced in phase by 90° by means of a phase shifter 30. The output of the amplifier 26 is applied to the first and second means 28 and 28', more particularly to the moving coils 14 and 14' shown in FIGS. 1A and 1B. The outputs from said first and second means 28 and 28', namely the induction coils 19 and 19' shown in FIGS. 1A and 1B, are negatively fed back to the input of said amplifier 26.

Thus, where the low frequency signal arriving at the input terminal 25 contains a hum component, a voltage as shown by Equation 8 will be fed back to the feedback terminal of the amplifier 26 in the manner as above described with the result that a low voltage signal free from any hum component will be obtained from the output terminal 27. In this case, by setting the feedback voltage to have a considerable magnitude it will become possible to eliminate hums of more than 20 db thus enabling accurate measurement or observation of the electrical phenonmena or vibration phenomena of living bodies.

Although in the above embodiment a negative feedback system is employed to elimniate or reduce hum components, it will be obvious that this invention is not limited to this particular arrangement and that the hum components can also be eliminated or cancelled out by differentially adding the output from the hum component detecting apparatus to the output signal from the amplifier 26.

As has been pointed out hereinabove, according to this invention as any component having the frequency different from that of the voltage of the AC source or of the reference signal does not appear on the output side of the hum component detecting apparatus there is no fear of producing distortion of the low frequent signal having a frequency different from that of the AC source voltage coincides with that of the low frequency signal, hum components would be eliminated simultaneously with the low frequency signal so that a distortion may occur in the output signal from the amplifier 26. However, according to this invention, unless the low frequency signal having the same frequency as that of the AC source voltage continues for more than several seconds, the delay of the feedback caused by the inertia as well as the damping means including in the hum component detecting apparatus assure distortionless amplification of the low frequency signal. Especially, since the component having the same frequency as the source voltage included in the electroencephalogram wave is not produced continuously, this, together with the delay action of the feedback provided by said inertia and damping positively prevents distortions from occurring in the waveform of the low frequency signal.

While the invention has been explained by describing a particular embodiment thereof, it will be apparent that improvements and modifications may be made without departing from the scope of the invention.

What is claimed is:

1. A hum component detecting apparatus comprising a first means and a second means identical to said first means; said first means including a first magnetic circuit, a first moving coil rotatably disposed in said first magnetic circuit, a second magnetic circuit adapted to produce a magnetic field having the same phase as that produced by said first magnetic field, a first voltage inducing means rotatably disposed in said second magnetic circuit, a first connecting means to mechanically interconnect said first moving coil and said first voltage inducing means, a damping means to provide a damping force and inertia to the rotary movement of said first connecting means, and a source of first reference voltage adapted to create magnetic fields in said first and second magnetic circuits; said second means including a third magnetic circuit, a second movable coil rotatably disposed in said third magnetic circuit, a fourth magnetic circuit adapted to produce a magnetic field having the same phase as that produced by said third magnetic field, a second voltage inducing means rotatably disposed in said fourth magnetic circuit, a second connecting means to mechanically interconnect said second moving coil and said second voltage inducing means, a second damping means to provide a damping force and inertia to the rotary movement of said first connecting means and a source of a second reference voltage dephased by 90° with respect to said first reference voltage; said detecting apparatus further comprising means to apply a low frequency signal containing a hum component across said first and second moving coils and means to combine the outputs from said first and second voltage inducing means whereby to detect said hum component.

2. The hum component detecting apparatus according to claim 1, wherein said voltage inducing means is an induction coil.

3. The hub component detecting apparatus according to claim 1, wherein said source of the reference voltage is a source of an AC voltage utilized for energizing said detecting apparatus.

4. A hum component eliminating device comprising an amplifier arranged to receive a low frequency signal containing a hum component, a first means and a second means supplied with the output from said amplifier, a source of reference voltage connected to said first means, a phase shifter adapted to shift the phase of said reference voltage by 90° and to supply the phase shifted voltage to said second means and means to negatively feedback to said amplifier an output signal provided by said first and said second means and representing said hum component whereby to eliminate said hum component from the output of said amplifier.

5. The hum component eliminating device according to claim 4, wherein said first means and said second means are identical to said first means and second means according to claim 1.

References Cited

UNITED STATES PATENTS 2,622,150 12/1952 Coulter et al. _____ 330—149
2,670,460 2/1954 Gilbert _____ 324—114 X ROY LAKE, Primary Examiner J. B. MULLINS, Assistant Examiner U.S. Cl. X.R.

330—149; 328—165